Feb. 6, 1934. G. E. ROWE 1,945,983
METHOD OF AND APPARATUS FOR MANUFACTURING HOLLOW GLASSWARE
Filed March 18, 1933 3 Sheets-Sheet 1
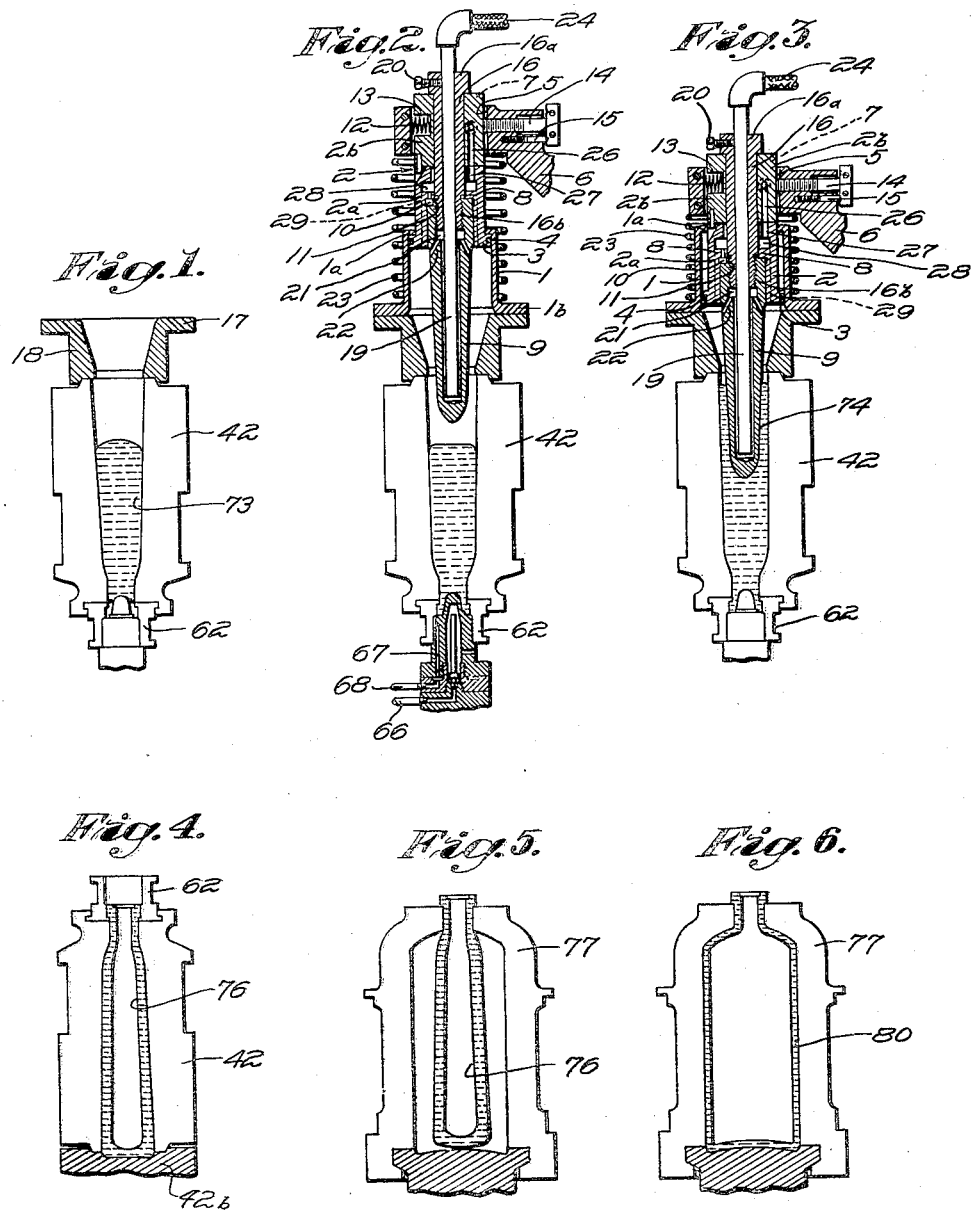

Feb. 6, 1934.     G. E. ROWE     1,945,983
METHOD OF AND APPARATUS FOR MANUFACTURING HOLLOW GLASSWARE
Filed March 18, 1933     3 Sheets-Sheet 2
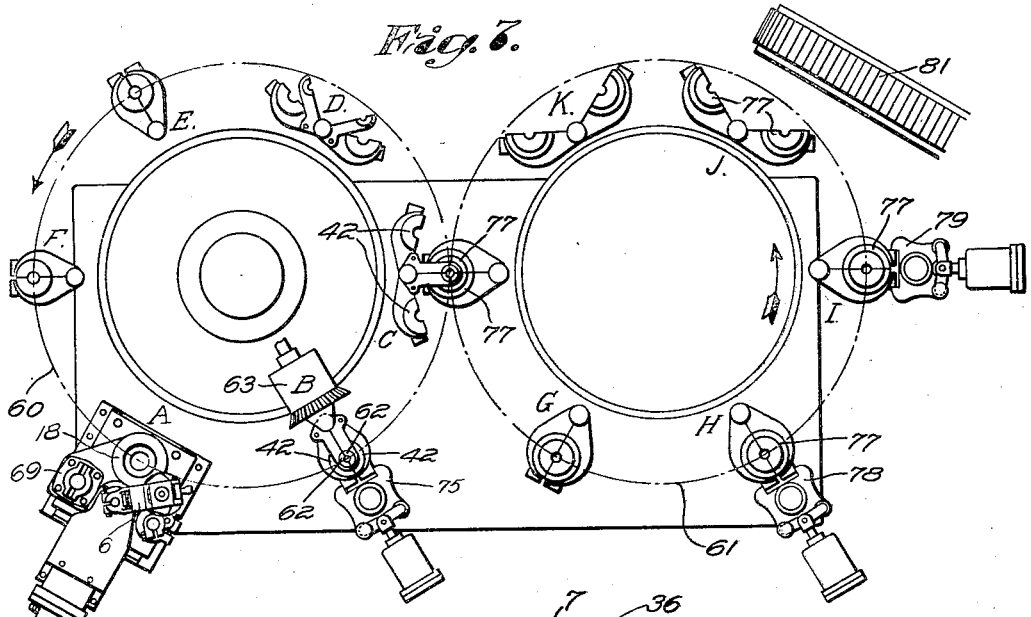
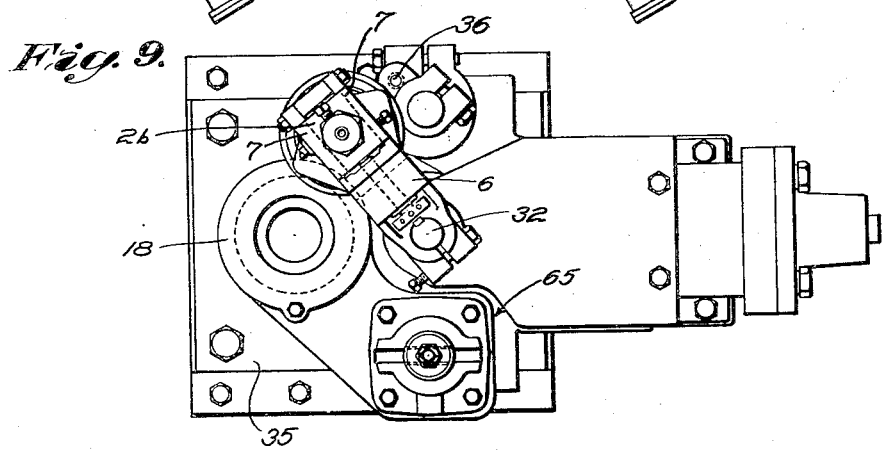
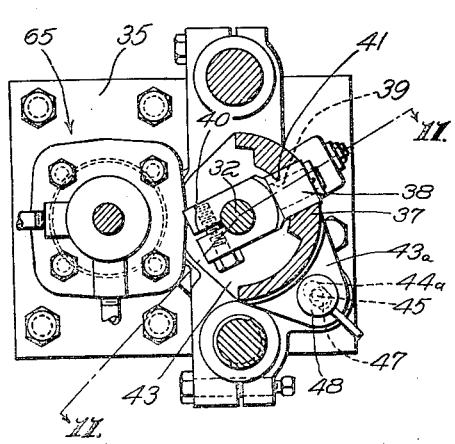
Witness:
W. B. Thayer
Inventor:
George E. Rowe
by Brown & Parlow
Attorneys Patented Feb. 6, 1934

1,945,983

UNITED STATES PATENT OFFICE 1,945,983

METHOD OF AND APPARATUS FOR MANUFACTURING HOLLOW GLASSWARE

George E. Rowe, Wethersfield, Conn., assignor to Hartford-Empire Company, Hartford, Conn., a corporation of Delaware Application March 18, 1933. Serial No. 661,521

14 Claims. (Cl. 49—9)

This invention relates to methods of and apparatus for manufacturing articles of hollow glassware, such as bottles, jars, and the like, and more particularly to the manufacture of such articles of glassware according to that general method in which glass shaping molds are charged with glass charges of insufficient mass completely to fill the cavities of such molds. Such charges ordinarily are produced by a feeder from which they pass or are delivered to the molds.

In the usual method of manufacturing articles of hollow glassware, such as bottles, from charges supplied thereto by a feeder, each of a series of molds is brought in its turn to a position to receive a charge from the feeder, such mold being inverted and open at its upper end when at the charge receiving station and the charge being dropped into the mold cavity through the open upper end thereof. The lower end portion of the inverted mold may be adapted to form the neck portion of the article to be made. It is usual to provide a neck pin which will protrude into the neck forming portion of the inverted mold at the charge receiving station. In order to force glass of the charge downwardly to the extreme lower end of the cavity of the inverted mold, around the upwardly projecting neck pin therein, so-called "settle" or "compacting" air pressure may be applied to the upper surface of the glass in the mold. Suction may be caused in the space around the neck pin in the neck forming portion of the mold in lieu of the air pressure on the surface of the glass or to supplement the action of such air pressure.

After the glass has been compacted in the mold cavity, it is usual to withdraw the neck pin, to apply a baffle or bottom plate to the open end of the mold, and to cause counterblowing of the glass by applying air under pressure to the space vacated by the neck pin. The counterblowing operation produces the so-called "bubble" in the glass in the mold and expands such glass into contact with the walls of the previously unoccupied end portion of the mold cavity next to the bottom plate and against the latter. This counterblowing operation may take place while the mold is still inverted or after reversion thereof.

The hollow glass body, formed in the manner described, may be, and usually is, transferred to another and larger mold in which such glass body is further expanded by air under pressure, applied to the interior thereof. When this procedure is followed, the mold in which the neck forming and counterblowing operations take place is termed a parison mold and the mold in which the final blowing of the body of the article takes place is termed a "final blow mold" or simply a "blow mold".

Articles produced by a mode of operation substantially as above described usually have so-called "counterblow wave lines" in the walls of the body portions thereof, indicating variations in thickness of such walls.

It has been proposed to obviate these wave lines by improvements in the general mode of operation above described. According to one of such proposals, a plunger is to be thrust downward into the glass in the inverted mold as soon as practicable after the mold has received its charge and while such mold is still at the charge receiving station. Thrusting the plunger downwardly into the glass in this manner will both tend to compact glass of the charge downwardly in the neck portion of the mold and also will cause upward displacement of glass between the plunger and the walls of the upper end portion of the mold cavity of the inverted mold. As a consequence, the differential between the times of chilling contact of different portions of the charge with the walls of the mold cavity will be reduced substantially and an axial cavity will be formed in the upper end portion of the glass in the inverted mold in addition to the smaller initial blow aperture or cavity in the glass in the lower end or neck finish portion of the mold. Then, when the counterblowing operation takes place, the formation of the bubble in the glass in the mold is effected by displacement of a relatively soft internal portion of the glass body in the mold, which glass body is already in contact at its lateral surface with the longitudinal walls of the mold cavity for substantially the entire length thereof. Subsequently, the hollow glass body or parison may be transferred to a final blow mold and blown to final form therein.

Apparatus for and a method of manufacturing bottles and other articles of blown glassware, including a glass compacting and cavity forming plunger or the use thereof, substantially as just described, are disclosed in the application of Arthur Edgar Smith, Ser. No. 635,360, filed September 29, 1932, and assigned to the owner of the present application.

It has been found in practice that the manufacture of articles of blown glassware by the improved method just described, while effective to obviate the "counterblow wave lines" of the prior and usually employed method, may be attended by certain difficulties which arise from the fact that the downwardly moving plunger is relied on both to compact glass of the charge in the lower end portion of the cavity of the inverted mold and to displace glass upwardly to form an annulus of glass in contact with the wall of the unfilled upper end portion of the cavity of the inverted mold. If such plunger has a size and stroke suitable to displace glass upwardly in the manner and to the extent desired, it may be ineffective to compact glass of the charge solidly in the space around the neck pin in the lower end portion of the inverted mold. Should the dwell of the plunger be increased to effect desired setting of the finish, the glass in contact with the plunger may be excessively chilled. Furthermore, the downwardly acting force exerted by such plunger then may displace the neck pin downwardly and cause scoring of or undue wear on the neck portion of the mold and even force the halves of the neck portion of the mold slightly apart when such neck portion comprises separable halves, as is usual.

These difficulties may vary with different service conditions, as with the size and configuration of the mold cavity, the plasticity of the glass in the mold, the cross-sectional area of the plunger, the construction of the mold, the size of the neck pin, the character of the means for maintaining the neck pin in its raised or operative position, the efficiency of the means for maintaining the halves of the neck portion of the mold closed at the charge receiving station, etc. Under particularly favorable conditions, such difficulties may not be marked. They are nevertheless inherent in the method which relies on the operation of the downwardly moving plunger for the performance of the dual functions above described.

An object of the present invention is to provide an improved method of manufacturing articles of blown glassware in which provision is made for obviating the difficulties above pointed out.

A more specific object of the invention is the provision of a method of the general character hereinbefore described but in which the compacting of glass of the charge in the neck portion of the inverted mold is effected by an independently regulable volume of air under pressure applied to the surface of the glass while the upward displacement of glass to provide an annulus of glass in the upper part of the cavity of the inverted mold is effected by the glass displacing action of a plunger.

A further object of the invention is the provision of novel means for associating and correlating the glass displacing plunger and the glass compacting air applying means and the operations thereof.

In carrying out the present invention, the mechanism for supporting and operating the glass compacting and cavity forming plunger of the aforesaid Smith application may be replaced by mechanism which will permit the application of a regulable amount of air under pressure to the surface of the glass in the inverted mold at the charge receiving station just prior to the downward projection of the plunger into such glass, whereby the compacting of the glass in the lower end or neck portion of the mold will be effected mainly, if not entirely, before glass of the charge in the mold is displaced upwardly by the downwardly moving plunger.

The upward displacement of glass by the plunger forms a full length blank or parison, having a cavity in the upper end portion thereof, and during this operation air under pressure may be applied onto the glass around the plunger, thereby exerting a smoothing effect on the glass that is being displaced upwardly by the downward stroke of such plunger.

Various adjustments of the relative times of application of the glass compacting air pressure and of the plunger and of the durations thereof may be effected and the character and effect of each of such applications may be independently adjusted.

Thus, the plunger functions mainly to displace glass upwardly for the cavity-forming operation. The duration of the application of the glass compacting air may be sufficiently long to set the finish in the neck portion of the mold without requiring the plunger to remain in contact with the glass for that period, thereby avoiding undue chilling of the glass in the upper portion of the mold cavity.

Other objects and advantages of the invention will become apparent from the following description, when it is considered in conjunction with the accompanying drawings, in which Figure 1 is a vertical section through a parison or blank mold at a charge receiving station and through a funnel or charge guide at the upper end of the mold, the view showing a charge of glass in the mold before the glass compacting or settling operation has been effected.

Fig. 2 is a view similar to Fig. 1, but showing a combined settle blow and plunger guiding and supporting head applied to the funnel at the upper end of the mold, the view showing the position of the parts after settle blowing pressure has been applied to the glass in the mold but before the plunger has been thrust downwardly into such glass, the view also showing the neck pin and a portion of its support in section to reveal the manner in which such neck pin may be cooled and subatmospheric pressure may be applied to the space around the tip thereof.

Fig. 3 is a view generally similar to Fig. 2, but showing the plunger at the end of its downstroke, a portion of the glass of the charge having been displaced upwardly to the level desired to form an annulus of glass between the plunger and walls of the previously unfilled upper end portion of the mold cavity.

Fig. 4 is a view through the parison mold of the preceding views after such mold has been reverted or returned to an upright position, the previously open bottom end thereof has been covered by a baffle or bottom plate, the neck pin has been withdrawn, and air pressure has been applied to the space vacated by the neck pin to effect counterblowing of the glass and the formation of a hollow parison in the mold;

Fig. 5 is a sectional view of a blow mold with the hollow parison of Fig. 4 disposed therein;

Fig. 6 is a view similar to Fig. 5, but showing the finally blown article, the same resulting from the expansion by blowing pressure of the parison of Fig. 5 against the walls of the blow mold;

Fig. 7 is a diagrammatic plan view of a two-table forming machine including apparatus embodying the improvement features of the present invention and adapted for the production of an article of blown glassware by the method of this invention;

Fig. 9 is a plan view of the structure shown in Fig. 8 with the mold unit of that view omitted;

Fig. 10 is a section substantially along the line 10—10 of Fig. 8; and

Figure 8:
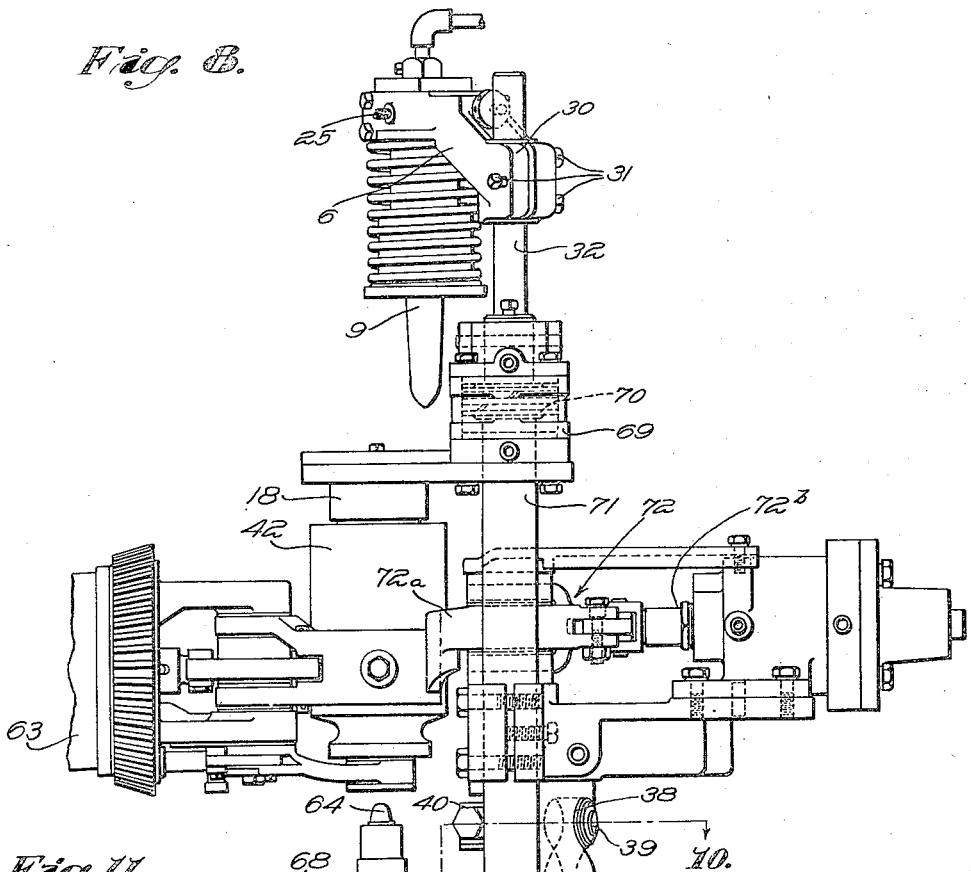
Fig. 8 is a relatively enlarged side elevation of the mechanism for adjustably supporting and operating the combined settle blow and plunger unit of the present invention, together with certain other associate mechanism of the forming machine.

A combined settle blow and plunger supporting head embodying structural features of the invention and adapted for use in the performance of the improved method is shown to advantage in Figs. 2 and 3. Such head comprises a longitudinally expansible and contractile shell consisting of telescopic tubular members indicated at 1 and 2, respectively. The member 2 is of less diameter than the member 1 and has an external flange 3 at its lower end fitting snugly but slidably in the section 1. A packing ring or gasket 4 may be disposed in a peripheral groove in the flange 3 so as to establish an air tight sliding fit between the lower end of the member 2 and the member 1. The upper end portion of the member 2 is adjustably supported within a vertical opening 5 in the end portion of a vertically movable arm 6.

The member 2 may be formed of two aligned sections, respectively designated 2a and 2b. The section 2a has the aforesaid flange 3 at its lower end, while the section 2b is uppermost and extends through the vertical opening 5 in the arm 6. The section 2b may have lateral supporting flanges 7 at its upper end (see Fig. 9), resting upon the upper surface of the arm 6 at opposite sides of the opening 5.

The section 2a has an internal flange 8 which constitutes an abutment for the upper end of a glass displacing plunger 9. A positioning pin 10 depends downwardly within the member 2a from the flange 8, and is received in a recess or notch 11 at the upper edge of the plunger 9. The combined function of the pin 10 and notch 11 is to position the plunger 9 in a particular angularly turned position in the member 2a. This is of utility in the event that the plunger 9 is non-circular in cross section, particularly if the mold cavity into which the plunger is to be lowered is also non-circular in cross-section.

In assembling the head, the section 2b is lowered through the opening 5 in the arm 6 until the flanges 7 rest on the upper surface of the arm 6. An expansion spring 12, at the outer end of the opening 5, fits in a lateral socket or recess 13 in the adjacent portion of the section 2b and holds the latter yieldingly against the end of an adjusting screw 14, which is threaded through an opening in the portion of the arm 6 at the rear of the opening 5. By turning the adjusting screw 14, the position of the member 2b may be adjusted longitudinally of the opening 5. A spring-pressed latch pin 15 engages with the head of the adjusting screw 14 to prevent accidental turning movement of the latter from any adjusted position.

The section 2a, on which the member 1 has been mounted, is placed in abutting relation with the section 2b and in axial alignment with the latter. The plunger 9 is then thrust upwardly through the member 1 into the section 2a and against the flange 8, as aforesaid. The parts then are retained in this assembled condition by a tubular retaining core 16 which fits within the aligned sections 2a and 2b, and has a head 16a resting upon the upper end of the section 2b and a screw-threaded lower end portion 16b screwed into the internally screw-threaded upper end portion of the plunger 9. An internal flange 1a at the upper end of the member 1 cooperates with the flange 3 to prevent the member 2a from moving upwardly completely through the member 1 and to support the member 1 from the member 2a when the entire assembly has been raised clear of any underneath support. The member 1 also may be provided at its lower end with an external flange 1b having a flat lower surface of substantial area. The flange 1b also may serve as an abutment for the lower end of an expansion spring 23 which encircles the members 1 and 2 and tends to hold them fully extended.

The plunger 9 may be hollow from its upper end nearly to its tip, as shown, and an air supply pipe 19 may be projected downwardly through the retaining core 16 to position to depend within the bore or axial cavity of the plunger 9 to a predetermined distance from the lower end thereof. A set screw 20 may be threaded through the head 16a of the core 16 against the tube 19 to retain the latter in adjusted position in the assembly. Air from the tube 19 will pass from the lower end thereof into the lower end of the axial cavity in the plunger 9, thence upwardly to an annular chamber 21 in the plunger at the lower end of the member 16, and thence downwardly through the orifices or passages 22 into the space surrounding the plunger 9.

The tube 19 may be connected by a suitable conduit, which may include a flexible section such as indicated at 24, with any suitable source of supply of air under pressure. Adjustment of the tube 19 in the plunger 9 may be utilized to vary the internal cooling of the plunger and also to vary within limits, the velocity of the air passing through the plunger.

In addition to the supply of air under pressure from the tube 19, a further supply of air under pressure may pass from a suitable air supply line, such as that indicated in part at 25 in Fig. 8, to a passage 26 in the section 2b of the member 2. This passage 26 is aligned with a passage 27 in the section 2a, Fig. 2. The passage 27 leads to an annular chamber 28, which in turn communicates through the vertical passages indicated by the dotted lines at 29 in Figs. 2 and 3 to the space around the plunger 9.

Figure 11:
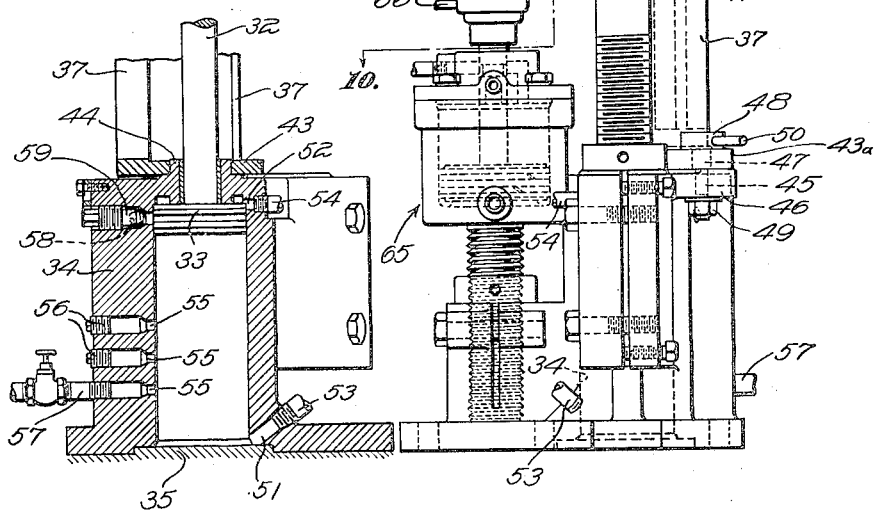
Fig. 11 is a section substantially along the line 11—11 of Fig. 10.

Referring now to Fig. 8, it will be noted that the arm 6 is provided at one end with a suitable clamping device 30, including screws 31, by means of which the arm and the parts carried thereby may be secured to a vertical shaft 32 in a vertically adjusted position on the latter. The shaft 32 is supported by a piston 33, Fig. 11, in a vertical cylinder 34, Figs. 8, 9 and 11. The cylinder 34 may be carried by a suitable base or supporting plate 35. When the piston 33 is at the upper end of the cylinder 34, as shown in Fig. 11, the shaft 32 will be in its raised position and the settle blow and plunger carrying head will have been raised and swung laterally to an out-of-the-way position, as shown in Fig. 8. When in this position, cooling fluid from a suitable source, such as indicated more or less diagrammatically at 36 in Fig. 9, may be blown upon the plunger 9 to cool the latter externally. The cooling fluid may be a spray of air and water or air and any suitable liquid that will not mark the glass.

The turning movement of the shaft 32 as it is moved vertically may be effected by a cam plate 37, Figs. 10 and 11, in cooperation with a roll 38 which is carried by a lateral arm or stud 39 on the shaft 32. The member 39 may be secured to the shaft 32 in any suitable known manner, as by the clamping device indicated at 40 in Fig. 10. The cam roll 38 works in a slot 41 in the plate 37, the upper portion of such slot being suitably curved to cause the combined settle blow and plunger carrying head to swing laterally between its out-of-the-way position, shown in Fig. 8, and a position directly above and in alignment with a parison body mold 42 at a charge receiving station. The remainder of the slot 41 is straight and vertical so as to cause vertical movements of the settle blow and plunger carrying head in alignment with the mold at the charge receiving station.

As a means for adjusting horizontally the entire path of reciprocation of the settle blow and plunger carrying head, provision may be made for adjusting the cam plate 37 angularly about the axial line of the shaft 32. The cam plate 37 is arcuate in cross sectional configuration, being concentric with the shaft 32 as clearly shown in Fig. 10. This cam plate is supported on a base 43 which is rotatably mounted on an axial upstanding boss 44 on the head of the cylinder 34. The plate 43 has a laterally extending portion 43a provided with a radial slot 44a therein. A vertical adjusting stud 45 has its shank pivoted in a lug 46 on the adjacent portion of a fixed support, as the cylinder 34, and has an eccentric adjusting portion 47 disposed in the radial slot 44a. The stud 45 and its eccentric 47 are retained in place by a head 48 which rests on the extension 43a of the cam plate base 43 and by a nut 49 which threadedly engages the lower end portion of the adjusting stud 45 and may be tightened against the fixed supporting lug 46. In order to adjust the cam plate 37 angularly about the axial line of the shaft 32 with a consequent horizontal adjustment of the path of movement of the combined settle blow and plunger carrying head, the nut 49 is loosened and a handle 50 on the head 48 is manipulated to turn the eccentric 47 in the slot 44a, whereby to swing the cam plate base 43, the cam plate 37, the stud 39, the shaft 32, and the piston 33 angularly about the axis of the shaft 32. The nut 49 then will be tightened to maintain the adjustment that has been effected.

Provision may be made for regulably controlling and varying the speed of the upstroke of the piston 33 and the speed of its downstroke. As shown in Fig. 11, the cylinder 34 is provided with ports 51 and 52 at its lower and upper ends respectively. These ports are connected with pipes 53 and 54, respectively, which pipes may serve alternately as air supply and exhaust conduits. It will be understood that the volume of air admitted to the cylinder 34 through either one of these pipes may be regulated and that the exhaust through such pipe likewise may be regulated as by the provision of a suitable valved air supply and exhaust mechanism, many examples of which are well known in the art and therefore need not be illustrated or specifically described herein.

In addition to the ports 51 and 52, the cylinder 34 may be provided with a series of vertically spaced ports 55, the lowermost of such ports preferably being located above the lower end of the cylinder a distance greater than the thickness of the piston 33. All of these ports 55 may be closed by plugs 56, or one of such ports may be provided with a valved pipe 57 and the remaining ports closed by the plugs 56, as shown in Fig. 11. The pipe 57 may be simply an exhaust pipe, the volume of the exhaust therethrough being regulated by the valve thereof.

A port 58 may be provided in the cylinder 34 above the uppermost of the ports 55 but below the upper end of the cylinder. This port 58, which may be connected with the pipe 54 or with the same air supply and exhaust controlling mechanism as the pipe 54, may be controlled by a needle valve 59 which may be adjusted so as completely to close the port 58 or to open it more or less.

With the arrangement just described, the speed of the downstroke of the piston 33 may be relatively rapid after the piston has moved downward to clear the port 58 until the piston moves to position to cover the port 55 with which the valved pipe 57 is connected. Thereafter the exhaust below the piston will be through the port 51 alone and the rate of downward movement of the piston will be retarded. This retardation of the rate of downward movement of the piston will be increased when such piston moves below the valved port 55, as thereafter part of the air above the piston will pass out of that port. The place in the downstroke of the piston at which the speed will change may be varied by selection of the port to be controlled by the valved pipe 57, the remaining ports 55 being closed by the plugs 56. The extent of such change may be varied by adjusting the valve of the pipe 57 and also to a certain extent by adjustment of the volume of air that causes the downstroke of the piston 33 and/or of the rate of exhaust from the port 51. The upstroke of the piston 33 may be relatively rapid until the piston reaches the level at which it begins to close the port 58, after which the exhaust will take place only through the port 52, and an air cushion in the upper end of the cylinder will retard the remainder of the upstroke of the piston.

The effect of these provisions for regulating the strokes of the piston 33 is to permit regulation of the reciprocatory movements of the plunger 9 between the position shown in Fig. 8 and the position shown in Fig. 3 and to permit adjustment, within limits, of the time elapsing from the seating of the member 1 of the combined settle blow and plunger carrying head on the funnel 18 until the plunger 9 has moved downward into contact with the glass in the mold at the charge receiving station.

The mechanism that has been described as embodying structural features of the invention may be associated with glassware forming instrumentalities of any suitable known construction.

In Fig. 7, such mechanism is shown as having been applied to an intermittent two-table forming machine of the type shown in Patent No. 1,766,135, granted June 24, 1930 to J. W. Lynch. This type of forming machine includes a parison mold table 60 and an adjacent blow mold table 61. The parison mold table supports a plurality of parison forming units, each including a two-part parison body mold such as that shown in Figs. 1 to 4 inclusive and hereinbefore designated 42. Associated with each parison body mold is a two-part neck ring or neck forming mold 62 such as that shown to advantage in Figs. 1 to 4 inclusive. Suitable mechanism is provided for mounting the halves of the parison body molds and the halves of the neck ring for opening and closing movements at the proper times in the cycle of rotation of the parison mold table 60. Also, the parts of each parison mold unit are mounted on a head such as indicated at 63 in Figs. 7 and 8, whereby the parison mold unit may be inverted to dispose the parison body mold uppermost, as shown in Figs. 1 to 3 inclusive Fig. 8, and at station A in Fig. 7, and may be reverted at the proper times to dispose the neck ring portion of the parison forming unit uppermost, as shown in Fig. 4 and at station B of Fig. 7.

When the parison forming unit is in its inverted position at a charge receiving station (station A of Fig. 7), a neck pin 64 may be raised by suitable mechanism, such as the pneumatic mechanism indicated at 65 in Fig. 8 until the tip of such neck pin extends into the neck ring portion of the parison forming unit, as shown in Figs. 1 to 3 inclusive. This neck pin may be hollow, so that it may be cooled by suitable cooling fluid which may be supplied through the pipe 66, Fig. 2. Also, the neck pin supporting mechanism may be provided with a passage 67 leading to the space between the tip of the neck pin and the adjacent walls of the neck ring. A conduit 68 may connect the passage 67 with suitable exhaust mechanism so that suction may be caused in the space surrounding the tip of the neck pin, if desired.

When the inverted parison forming unit is at the charge receiving station, a charge guide or funnel, such as that hereinbefore referred to and designated 18, may be lowered to position to seat on the upper end of the inverted body mold, as shown in Figs. 1 to 3 inclusive, Fig. 8, and at station A in Fig. 7. The funnel 18 may be moved vertically to and from this position by any suitable mechanism, such as the pneumatic mechanism shown in Fig. 8, which mechanism includes a vertically movable cylinder 69 from which the funnel 18 is supported. The cylinder 69 is guided in its vertical movements by a stationary piston 70 on a longitudinally adjustable vertical shaft 71, air pressure being alternately admitted to and exhausted from each end of the cylinder 69 to reciprocate vertically such cylinder and the funnel carried thereby. Any other suitable known mechanism may be employed to move the funnel to and from an operative position at the upper end of the inverted parison forming unit at the charge receiving station.

It also will be understood that any suitable charge delivery mechanism may be employed. If a funnel or guide be employed, the same may be located at or periodically moved to a position out of the path of movement of the combined settle blow and plunger carrying head, so that the latter may be lowered periodically to seat on the inverted mold at the charge receiving station.

The parison body mold at the charge receiving station may be maintained closed by a suitable clamping device such as that indicated generally at 72 in Fig. 8. This clamping device comprises jaws, one of which is shown at 72a. These jaws are pivoted to swing about the axis of a portion of the shaft 32 adjacent to the charge receiving station. The jaws are opened and closed by a cylinder and piston mechanism, indicated at 72b, such mechanism being supported in a fixed position with relation to the pivotal axis of the jaws 72a so that the closing of the jaws against the halves of the mold at the charge receiving station will accurately align that mold with the plunger 9 when the latter is moved downward into the mold.

The parts described and other associate parts of the complete glassware forming machine may be actuated, and the operations thereof timed in any suitable known manner as by operating and timing mechanism similar to that shown in the aforesaid Lynch patent.

A cycle of operations for carrying out the invention with the use of the mechanism described may be substantially as follows:

The rotation of the parison mold table 60 will bring a parison forming unit to the station A, the parison forming unit being inverted when at that station. In its inverted position, the parison body mold will be open at its upper end and the neck ring will be closed at its lower end by the neck pin and its supporting structure. A charge of glass from a suitable source of supply, such as an associate feeder (not shown), will be delivered to the inverted parison mold through the funnel 18. The glass charge in the mold, after its delivery thereto and before such glass has been compacted in the mold, is indicated at 73, in Fig. 1.

While this parison forming unit is still at the charge receiving station, the piston 33 will be lowered in the cylinder 34 to swing the combined settle blow and plunger carrying head directly above the inverted mold and then downwardly until the member 1 of such head is seated upon the funnel 18 as shown in Fig. 2. Air is supplied through the pipe 19 and the interior of the plunger to the space within the member 1 whence such air passes through the funnel 18 to the space above the glass in the inverted parison body mold. The air applied to the glass in the parison body mold may be supplemented by air pressure applied through the head from the pipe 25. This air not only serves to cool the plunger internally and at its outer surface, but will compact the glass in the mold so that glass will be packed in the space between the tip of the neck pin and the adjacent walls of the neck ring, the glass in the mold then having somewhat the position and shape indicated in Fig. 2.

It is to be understood of course that the beginning of application of air pressure to the glass in the inverted parison body mold may commence as soon as the member 1 moves downward into air-tight contact with the funnel 18. As soon as the member 1 seats on the funnel 18, the further downward movement of the piston 33 and arm 6 will cause the member 2 to telescope within the member 1 so that the member 9 will be moved axially downward toward the glass in the mold. As the downstroke of the piston 33 continues, the plunger 9 will move downward into the glass in the mold until a portion of such glass has been displaced upwardly between the plunger and the walls of the previously unfilled upper end portion of the inverted parison body mold, as indicated at 74 in Fig. 3.

During this glass displacing action of the plunger, the air through the combined settle blow and plunger carrying head may continue to pass downward along the walls of the plunger onto the glass that is being forced upwardly by the displacing action of the plunger. This will tend to smooth the upper surface of the annulus of glass between the plunger and the walls of the mold. If desired, the pressure applied to the glass in the mold may be reduced substantially after the initial glass compacting action, as by cutting off application of air through the tube 25 while air continues to pass from the interior of the plunger to the space surrounding the plunger.

After displacement of glass in the manner illustrated in Fig. 3, the plunger may be withdrawn upwardly by operation of the operating mechanism hereinbefore described, and the combined settle blow and plunger carrying head lifted from the funnel, leaving an axial cavity in the glass body within the inverted parison mold. It will be noted that the annulus of glass between the plunger and the walls of the upper portion of the mold cavity may not extend entirely to the top of the mold cavity, but may be stopped just short thereof, as shown in Fig. 3.

After the withdrawal of the plunger, the walls of the cavity thus formed in the glass may be permitted to reheat somewhat and the mold then may be reverted and a bottom plate such as indicated at 42b in Fig. 4 may be applied to the parison body mold. It of course will be understood that the neck pin is withdrawn from the lower end of the inverted parison mold unit before the reversion thereof.

The reversion of the parison mold unit may be effected while such unit is moving between the stations A and B of Fig. 7. At station B, the halves of the reverted or upright parison body mold may be clamped in closed position by a clamping device 75, which may be generally similar to that shown in the aforesaid Lynch patent. A suitable blow head may be applied to the upper end of the inverted parison forming unit and air pressure applied to the space left vacant by the withdrawal of the neck pin so as to effect a counterblowing action in the glass in the mold. A bubble thus will be formed therein, as indicated at 76 in Fig. 4. The glass in the mold then has the form of a hollow parison having the neck portion thereof formed as shown in Fig. 4. This counterblowing operation may take place at station B of Fig. 7.

The next station shown of Fig. 7, designated C, is the transfer station. At this station the halves of the body mold are open and the parison is suspended from the neck ring in position to be disposed within a blow mold such as that indicated at 77 in Figs. 5, 6 and 7. Such blow mold comprises halves which are closed about the suspended parison at the transfer station. The neck ring is opened to complete the transfer of the parison to the blow mold, as shown in Fig. 5.

Both the neck and parison body mold portions of the parison forming unit may be open for cooling at the station D of Fig. 7. These portions of the parison mold unit may be closed during the movement of the parison mold table to bring them to the station E. The parison mold unit may remain closed as it is moved to and past the station F, after which the parison mold unit will be inverted and again presented at the charge receiving station A.

In the meantime, the blow mold 77 with the parison therein will be moved by the rotation of the blow mold table 61 to the stations G, H and I in turn. The glass parison may be permitted to reheat in the blow mold until it reaches the station H, at which station a blow head may be lowered onto the mold and blowing pressure applied to the interior of the parison. During this blowing operation, the halves of the blow mold may be clamped together by a clamping device 78 which may be similar to the clamping device 75. The blowing of the parison to final form in the blow mold may not be completed at station H, but further blowing may be effected at station I. If so, the halves of the blow mold may be clamped together at that station by a clamping device 79. Irrespective of whether or not the blowing of the parison to final form is effected at one or more stations, the glass will be expanded to have the form of the blow mold, which determines the external configuration of the finished article, which may be a bottle, such as indicated at 80 in Fig. 6.

With glassware forming apparatus of the type indicated in Fig. 7, the blow mold may be opened at station J and the finished article removed therefrom and transferred to a suitable conveyor 81 for delivery to a glassware annealing lehr (not shown). The halves of the blow mold may remain open while they are moved to and past the station K. Thereafter, the open blow mold will be again brought to the transfer station C, and the halves thereof will be closed about another parison, which in the meantime has been formed and brought to that station.

It will be understood that the depth to which the plunger 9 will be thrust downwardly into the glass at the charge receiving station may be regulated by adjustment of the position of the arm 6 on the shaft 32. The plunger may be centered with respect to the mold by horizontal adjustment of the arm 6 and/or the head in the vertical opening 5 of the arm 6 in the manner described. The duration of the period of application of the settle blowing air to the glass in the inverted parison mold before the plunger moves downwardly into contact with the glass may be varied within limits, as hereinbefore has been described or in any other suitable manner. The volume of the settle blowing air may be regulated and the speed of the movements of the plunger likewise may be regulated so as to produce exactly the glass settling or compacting action desired and exactly the glass displacing plunger action desired. If desired, suction may be employed in the space around the tip of the neck pin to supplement the compacting action of the air on the surface of the glass in the mold.

The cross-sectional configuration of the plunger should conform to that of the cavity in which the plunger works so as to produce a symmetrical space between the plunger and the walls of the mold cavity when the plunger is down. Thus, if the mold cavity is circular in cross section, the plunger preferably should be circular. If the mold cavity is oval, the plunger should be oval, etc.

While the invention has been described as applied to a particular type of glassware forming machine and the method has been described as performed by the use of apparatus of that type, it is to be understood that the invention is not restricted to such application, but is generally applicable to the manufacture of articles of hollow glassware from charges which are of insufficient mass completely to fill the cavities of the molds to which they are delivered and in which a counterblowing of the glass is to be effected as a step in the production of the article desired. The invention therefore is not to be limited except by the terms of the appended claims.

I claim:

1. The method of producing a parison for a bottle or like glass article, which comprises the steps of introducing a charge of molten glass into an inverted blank mold having a neck forming portion at its lower end, compacting glass of the charge into the neck forming end of said mold by applying air pressure to the upper surface of the glass in said mold, thrusting a plunger downward into the glass in the mold to displace a portion of it upwardly in the annulus between the plunger and the mold walls, retiring the plunger, and introducing blowing pressure to the interior of the glass in the neck forming end portion of said mold to eliminate the cavity left by the retirement of the plunger and to produce a hollow parison.

2. The method of producing a parison for a bottle or like glass article, which comprises the steps of introducing a charge of molten glass into an inverted blank mold having a neck forming end portion at its lower end, compacting glass of the charge into the neck forming end of said mold by applying air pressure to the upper surface of the glass in said mold, thrusting a plunger downward into the glass in the mold to displace a portion of it upwardly in the annulus between the plunger and the mold walls nearly but not quite to the top of said annulus, retiring the plunger, and introducing blowing pressure to the interior of the glass in the neck forming end portion of said mold to eliminate the cavity left by the retirement of the plunger and to produce a hollow parison.

3. The method of producing a parison for a bottle or like glass article, which comprises the steps of delivering a charge of molten glass to the cavity of an inverted blank mold having a neck forming end portion at its lower end, compacting glass of the charge in the neck forming end of said mold by applying air under pressure to the upper surface of the glass in the mold, thrusting a plunger downward into the glass in the mold to displace a portion of it upwardly in the annulus between the plunger and the mold walls, continuing the application of air under pressure to the surface of the glass being displaced upwardly in said annulus, retiring the plunger so as to leave an axial cavity in the glass in the upper portion of the inverted mold, and introducing blowing pressure into the glass in the neck forming end of said mold to eliminate said cavity and to provide a bubble in the glass in said mold.

4. In the manufacture of hollow glassware, the method which comprises the steps of delivering a charge of glass to a mold, applying air under pressure to the surface of the glass at one end of said mold to settle glass of the charge in the opposite end of the mold cavity, thrusting a plunger into the glass at the end of the mold to which said air under pressure has been applied and in spaced relation with the side walls of the mold cavity to displace glass of the charge against the mold walls surrounding said plunger, applying air under pressure to the glass thus displaced during the displacement thereof by said plunger, retiring the plunger, and counterblowing glass in the mold cavity by applying air under pressure to the interior of the glass at the end of the mold cavity opposite that to which said plunger was applied.

5. In the manufacture of hollow glassware, the method which comprises the steps of delivering a charge of molten glass to a vertically disposed mold, said charge of glass being of insufficient mass completely to fill the mold cavity from its lower end to its upper end, settling the glass in the mold cavity by applying air under pressure to the upper surface of the glass in said mold, thrusting a plunger downward into the glass in the mold cavity to displace glass of the charge in the mold cavity upwardly between the plunger and the adjacent walls of said mold cavity, regulating the depth of projection of the plunger into the glass to regulate the level to which glass will be displaced by the downward stroke of the plunger, retiring the plunger so as to leave an axial cavity in the upper portion of the glass in the mold, and counterblowing glass in the mold by introducing blowing pressure into the glass at the end thereof opposite that provided with said cavity.

6. In the manufacture of hollow glassware, the method which comprises the steps of delivering to a vertically disposed mold a charge of glass of insufficient mass completely to fill the mold cavity from its lower end to its upper end, settling the glass in the mold cavity by applying air under pressure to the upper surface of said glass, thrusting a plunger axially downward into the glass in the mold to displace glass of the charge in the mold upwardly between the plunger and the adjacent walls of the mold cavity, independently regulating the air pressure applied to the surface of such glass to regulate the glass compacting action of said air pressure and the downward stroke of the plunger to regulate the glass displacing effect thereof, retiring the plunger so as to leave an axial cavity in the upper portion of the glass in the mold, and thereafter counterblowing glass in the mold by introducing air under pressure into the glass at the end of the mold opposite that provided with said axial cavity.

7. In apparatus for forming a glass parison, a mold open at its upper end and having a neck forming portion at its lower end, said mold being adapted to receive a charge of glass, and a unitary device comprising means for applying air under pressure to the surface of the glass in the mold to settle glass of the charge in the neck portion of the mold and means for exerting a downward force on an axial portion of the glass in the mold of less area than that of the complete upper surface thereof to displace glass of the charge upwardly against the walls of a previously unfilled upper end portion of the mold cavity.

8. In apparatus for forming a glass parison, the combination with an inverted mold having a neck forming portion at its lower end, of a plunger adapted to be thrust downwardly into the glass in the upper portion of the mold, and a combined settle blowing and plunger carrying head for applying air under pressure to the upper surface of the glass in the mold for compacting glass of the charge in the neck forming portion of the mold and for supporting said plunger for axial movements downwardly into the glass in the mold and upwardly to a position to clear the upper end of said mold.

9. In apparatus for the manufacture of articles of hollow glassware, a mold, means for presenting said mold at a station at which a charge of glass may be delivered thereto, a plunger adapted to be projected downwardly into the glass in the mold to displace a portion of said glass upwardly in the space between the plunger and adjacent walls of the mold so as to produce an open-ended cavity in the upper portion of the glass in the mold, and means for applying air under pressure to the surface of the glass in the mold to compact glass of the charge in the lower end portion of the mold prior to said glass displacing action by said plunger.

10. In apparatus for the manufacture of articles of hollow glassware, a mold, means for presenting said mold at a station at which a charge of glass may be delivered thereto, a plunger adapted to be projected downwardly into the glass in the mold to displace a portion of said glass upwardly in the space between the plunger and adjacent walls of the mold so as to produce an open-ended cavity in the upper portion of the glass in the mold, means for applying air under pressure to the surface of the glass in the mold to compact glass of the charge in the lower end portion of the mold prior to said glass displacing action by said plunger, and means for regulably controlling the time interval between the beginning of application of said air under pressure to the glass and the time of application of the glass displacing plunger to the glass.

11. In apparatus for the manufacture of articles of hollow glassware, a mold, means for presenting said mold at a station at which a charge of glass may be delivered thereto, a plunger adapted to be projected downwardly into the glass in the mold to displace a portion of said glass upwardly in the space between the plunger and adjacent walls of the mold so as to produce an open-ended cavity in the upper portion of the glass in the mold, and means for compacting glass of the charge in the lower end portion of the mold by applying air under pressure to the surface of the glass in the mold prior to and during said glass displacing action by said plunger.

12. In apparatus for the manufacture of articles of hollow glassware, the combination with an inverted mold at a charge receiving station, said mold having a neck forming portion at its lower end, of a plunger adapted to be thrust downwardly into the glass in the mold and withdrawn therefrom, a head for applying air under pressure to the surface of the glass in the mold and for operating said plunger, said head comprising a plurality of vertically disposed telescopic tubular members surrounding said plunger, means securing the uppermost of said sections and said plunger together for movement as a unit while permitting relative axial movement of the plunger and the lowermost of said tubular members, spring means yieldingly holding the tubular members of said head extended, a vertically reciprocating carrier supporting and imparting vertical movements to the uppermost tubular member of said head, and means for supplying air under pressure to the interior of said head.

13. In apparatus for the manufacture of articles of hollow glassware, the combination with a mold at a charge receiving station, of a plunger adapted to be projected downwardly into the glass in the mold and raised therefrom, a settle blow head surrounding said plunger, the walls of the lower end portion of said head being spaced from said plunger and the upper portion of the head having a substantially air-tight fixed supporting connection with the upper end portion of said plunger, said plunger having an axial bore closed at the tip of the plunger and provided at a higher level with a port communicating with the interior of the head, a pressure fluid supply tube depending in the bore of the plunger toward the tip thereof and below the level of said port, and a vertically movable carrier for said head.

14. In apparatus for the manufacture of articles of hollow glassware, the combination with a mold at a charge receiving station, of a plunger adapted to be projected downwardly into the glass in the mold and raised therefrom, a settle blow head surrounding said plunger, the walls of the lower end portion of said head being spaced from said plunger and the upper portion of the head having a substantially air-tight fixed supporting connection with the upper end portion of said plunger, said plunger having an axial bore closed at the tip of the plunger and provided at a higher level with a port communicating with the interior of the head, a pressure fluid supply tube depending in the bore of the plunger toward the tip thereof and below the level of said port, other means for introducing pressure fluid into the space in said head surrounding said plunger, and a vertically movable carrier for said head.

GEORGE E. ROWE.